United States Patent Office 2,899,463
Patented Aug. 11, 1959

2,899,463

PREPARATION OF OXYGENATED RESIN ACID DERIVATIVES

Richard N. Moore, El Dorado, Ark., and Ray V. Lawrence, Lake City, Fla., assignors to the United States of America as represented by the Secretary of Agriculture No Drawing. Application April 16, 1957
Serial No. 653,256

11 Claims. (Cl. 260—514.5)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of carbonyl, hydroxy-carbonyl, and phenolic resin acid derivatives by air oxidation of levopimaric acid and its derivatives in alkaline medium and by catalytic rearrangement of 6,14-peroxy-Δ7(8)-dihydroabietic acid and its derivatives as the primary step.

In accordance with this invention it has been found that 6,14-peroxy-Δ7(8)-dihydroabietic acid is readily rearranged to 6-keto-14-hydroxy-Δ7(8)-dihydroabietic acid by subjection to alkaline conditions. The peroxide can be prepared and rearranged, or the hydroxy-carbonyl derivative can be obtained, by carrying out the process of photosensitized air oxidation of levopimaric acid in alkaline medium. The hydroxy-ketone, thus obtained, can be dehydrated to 6-keto-abietic acid and 6-hydroxydehydroabietic acid.

The following formula for abietic acid shows the numbering system used in this specification and the claims appended thereto, to designate the structures of the various products derived from levopimaric acid in accordance with this invention.

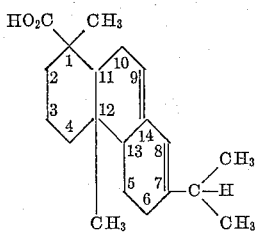

A conventional, but laborious and expensive, method [J. Am. Chem. Soc., 61, 2528 (1939)] has been described for the preparation of 6-hydroxydehydroabietinol from dehydroabietic acid and the product was shown to have marked physiological activity. We have found that this phenolic compound can readily be prepared from levopimaric acid in good yield by the methods described herein. Oxidation of levopimaric acid in alkaline medium by molecular oxygen in the presence of light and a suitable sensitizing dye such as one of the resorcinolphthaleins, proceeds by way of 6,14-peroxy-Δ7(8)-dihydroabietic acid and subsequent rearrangement in situ to give 6-keto-14-hydroxy-Δ7(8)-dihydroabietic acid. Dehydration of the hydroxy-ketone is readily effected by the addition of an excess of a strong acid such as hydrochloric acid and refluxing briefly to give 6-hydroxydehydroabietic acid in good yield. The 6-hydroxydehydroabietic acid is easily reduced to 6-hydroxydehydroabietinol by treatment with a metal hydride such as lithium aluminum hydride.

The following examples will illustrate the process of preparing 6-keto-14-hydroxy-Δ7(8)-dihydroabietic acid by air oxidation of levopimaric acid in alkaline medium and by catalytic rearrangement of preformed 6,14-peroxy-Δ7(8)-dihydroabietic acid, and further steps in the process to produce by dehydration and rearrangement, 6-ketoabietic acid and 6-hydroxydehydroabietic acid, in accordance with this invention. Further details on the preparation of peroxides from resin acids and their derivatives are given in our co-pending application on resin acid peroxides, Serial No. 653,255, filed April 16, 1957.

*Example 1*

Oxidation of levopimaric acid was conducted in an apparatus which consisted of two concentric glass tubes mounted vertically, the outer tube being 4.28 cm. in inside diameter, and 54 cm. in length, and fitted at the lower end with a sintered glass gas inlet. The inner tube, open only at its upper end, was 3.48 cm. in outside diameter and 55 cm. in length and contained a commercial 15 watt fluorescent tube type lamp. A solution 0.1 molar in levopimaric acid, 0.2 molar in sodium hydroxide and containing 0.10 g. of rose bengal per liter of solution was prepared in 95% ethanol. A vigorous stream of alcohol saturated air was forced through the outer tube of the apparatus and 280 ml. of the solution was charged into the intertubular space. The light was turned on and samples were withdrawn periodically for analysis. Reaction temperature ranged from 25° to 40° C. The samples were stored in the dark overnight at room temperature in stoppered containers to permit completion of the base catalyzed rearrangement of the peroxide formed. Ultraviolet absorption spectra of the samples were then determined in alcoholic solution. The destruction of the characteristic absorption of the levopimaric acid at 272 millimicrons and the related formation of the γ-hydroxy-α,β-unsaturated ketone with maximum absorption at 234 millimicrons in ethanol solution is shown by the spectroscopic data tabulated below.

| Reaction Time in minutes | α (272 millimicrons) | α (234 millimicrons) |
|---|---|---|
| 0 | 18.03 | 3.45 |
| 30 | 13.34 | 7.32 |
| 60 | 8.41 | 11.08 |
| 90 | 4.50 | 15.16 |
| 120 | 1.32 | 18.60 |

The reaction was terminated after 120 minutes and the product solution was allowed to stand overnight so that the rearrangement of the peroxide to the hydroxy-ketone could proceed to completion. The hydroxy-ketone was then dehydrated and rearranged to a phenolic material by acidifying the product solution with 9.5 ml. of concentrated hydrochloric acid in 25 ml. of alcoholic solution, and subsequently refluxing for 30 minutes. The phenolic product was precipitated by dilution of the alcoholic solution with water, after which the precipitate was filtered out and recrystallized twice from carbon tetrachloride to give 7.80 g. of 6-hydroxydehydroabietic acid containing 24% carbon tetrachloride. Yield of the phenol was 66% of the theoretical amount based on the levopimaric acid charged to the reaction. The 6-hydroxydehydroabietic acid was identified by conversion to its methyl ester in 90% yield on treatment with diazomethane in ether. The ester melted at 162–162.5° C. after four recrystallizations from methanol-water and showed $[\alpha]_D$ +71° (1% in ethanol). Elemental composition of the methyl ester was confirmed as $C_{21}H_{30}O_3$ by analysis. Reduction of 0.095 g. of methyl-6-hydroxy-dehydroabietate using lithium aluminum hydride in ethereal solution gave 0.09 g. of 6-hydroxydehydro-abietinol which after repeated crystallization melted at 180–182° C. and showed $[\alpha]_D$+65° (1% in ethanol).

Example 2

Pure levopimaric acid photoperoxide (5.00 grams) was dissolved in 50 ml. of 1 molar sodium hydroxide in 95% ethanol. The solution warmed spontaneously to 46° C. and was then further heated to boiling, refluxed for 10 minutes, cooled, acidified with 5 ml. of glacial acetic acid, and the $\gamma$-hydroxy-$\alpha,\beta$-unsaturated ketone was watered out of solution and filtered off, yielding a precipitate weighing 4.78 g. after drying in a vacuum; yield 96% of theory. The 6-keto-14-hydroxy-$\Delta7(8)$-dihydroabietic acid, after two recrystallizations from acetonitrile, showed $[\alpha]_D+27°$ (1% in ethanol)

$\lambda_{max}^{alc}$ at 235 millimicrons, $\epsilon$ 6,920

It melted about 150° C., with loss of water. Treatment of 6-keto-14-hydroxy-$\Delta7(8)$-dihydroabietic acid with diazomethane in ethereal solution gave the methyl ester which, after one recrystallization from methanol-water and two from heptane, melted at 134–135.5° C. and showed $[\alpha]_D+28°$ (1% in ethanol)

$\lambda_{max}^{alc}$ at 234 millimicrons, $\epsilon$ 6,750

The elemental composition of the ester was confirmed as $C_{21}H_{32}O_4$ by analysis. Presence of the alcoholic hydroxyl group was shown by the presence of a strong bonded OH stretching band at 2.90 microns in the infrared absorption spectrum. The tertiary, $\alpha,\beta$-unsaturated position of the hydroxyl group was shown by the ease with which the hydroxy-ketone was dehydrated. It gave a positive carbonyl test with dinitrophenylhydrazine and the ultraviolet absorption spectrum with maximum absorption at 234 millimicrons agrees well with the calculated position of the maximum for 6-keto-14-hydroxy-$\Delta7(8)$-dihydroabietic acid. The $\gamma$-hydroxy-$\alpha,\beta$-unsaturated ketone was dehydrated to a mixture of 6-hydroxy-dehydroabietic acid and an $\alpha,\beta,\gamma,\delta$-unsaturated ketone which showed maximum absorption in the ultraviolet region at about 295 millimicrons. This showed that the product formed by the alkaline rearrangement of the levopimaric acid photoperoxide was 6-keto-14-hydroxy-$\Delta7(8)$-dihydroabietic acid.

Example 3

A solution comprised of 4.0 g. of 6-keto-14-hydroxy-$\Delta7(8)$-dihydroabietic acid in 25 ml. of glacial acetic acid was refluxed for 10 minutes. After the addition of three drops of concentrated sulfuric acid, reflux was continued for 16 additional hours. The solution was then cooled and the product was watered out and recovered by filtration. It was washed with water and dried under vacuum to yield 4.0 g. of 6-hydroxydehydroabietic acid showing maximum ultraviolet absorption at 284 millimicrons in alcohol solution with a specific extinction coefficient of 11.3.

Example 4

A solution comprised of 8.46 g. of levopimaric acid, 2.7 g. of sodium hydroxide, and 0.028 g. of rose bengal in sufficient 95% ethanol to give a total volume of 280 ml., was charged to the reaction vessel described under Example 1, and sparged with a vigorous stream of alcohol saturated air and irradiated by the 15 watt fluorescent light for 7 hours. The ultraviolet absorption maximum of the levopimaric acid at 272 millimicrons was completely destroyed during this time and the new maximum which appeared at 234 millimicrons due to the formation of 6-keto-14-hydroxy-$\Delta7(8)$-dihydroabietic acid attained a specific extinction coefficient of 18.2. The product solution was acidified with dilute acetic acid and the product was watered out and recovered by filtration to yield after vacuum drying, 7.64 g. of 6-keto-14-hydroxy-$\Delta7(8)$-dihydroabietic acid. After correcting for samples removed for analysis during the reaction, this amounted to a yield of 83% of the theoretical amount.

Example 5

A crude preparation of 6-hydroxydehydroabietic acid, obtained by the procedure given in Example 1, was recrystallized from carbon tetrachloride, from which it crystallized in the form of a molecular complex containing a large amount of the solvent. It was then recrystallized three times from glacial acetic acid, washed with water and dried under vacuum to give a pure molecular compound of one mole of acetic acid for each mole of 6-hydroxydehydroabietic acid, neutral equivalent, Calculated: 188, Found: 188, $[\alpha]_D+62°$ (2% in ethanol), with maximum absorption in the ultraviolet at 283 millimicrons with a specific extinction coefficient of 8.37. The compound decomposed at temperatures above about 150° C. The carbon and hydrogen content was found by analysis to be in agreement with that calculated for an equimolecular compound of 6-hydroxydehydroabietic acid and acetic acid.

Example 6

A solution was prepared in 10 ml. of glacial acetic acid containing 0.10 g. of 6-keto-14-hydroxy-$\Delta7(8)$-dihydroabietic acid which had $[\alpha]_D^{25}+27°$ (1% in ethanol) and showed maximum absorption of ultraviolet light in ethanol solution only at a wavelength of 234 millimicrons in the wavelength range of 220–320 millimicrons. The hydroxy-ketone showed $[\alpha]_D^{25}+43°$ in the acetic acid solution. The solution was refluxed for 10 minutes during which time the $[\alpha]_D$ changed from $+43°$ to $-12°$. The dehydration product was watered out of solution and recovered by filtration. Its ultraviolet absorption spectrum showed that the absorption maximum of the hydroxy-ketone at 234 millimicrons was absent and the dehydration was therefore complete. It also exhibited maximum ultraviolet absorption at 291 millimicrons with a specific extinction coefficient of 26.3. Identification of 6-hydroxydehydroabietic acid, as one dehydration product, established the position of the keto group in the hydroxy-ketone as being at carbon atom 6. A resin acid dienone was precipitated from the dehydration product as the 2-amino-2-methyl-1-propanol salt which showed maximum ultraviolet absorption at 293 millimicrons with a specific extinction coefficient of 23.9. The dienone, derived from a 6-keto-dihydroabietic acid having a tertiary, $\alpha,\beta$-unsaturated hydroxyl group $\gamma$ to the keto group and having characteristic ultraviolet absorption at 293 millimicrons, was therefore 6-ketoabietic acid.

Example 7

A slurry comprised of 1.31 g. of lithium aluminum hydride in 25 ml. of dry diethyl ether, was prepared in a 100 ml. round bottom flask fitted with a mechanical stirrer, a reflux condenser, and an addition funnel. The slurry was stirred and a solution comprised of 2.00 g. of the molecular compound of 6-hydroxydehydroabietic acid and acetic acid obtained in Example 5 was added by way of the addition funnel during a period of twenty minutes. The slurry was then heated to maintain reflux for an additional twenty minutes. Excess lithium aluminum hydride was destroyed by the addition of wet ether and then 40 ml. of 3 normal aqueous sulfuric acid was added. The ether layer was separated and the aqueous layer was extracted with an additional portion of ether. The ether layers were combined and dried over anhydrous sodium sulfate, filtered, and the ether was removed by evaporation. The crystalline residue weighed 1.48 g. after drying under vacuum; yield 92% of theory, M.P. 166–174° C. Pure 6-hydroxydehydroabietinol, after four recrystallizations from methanol-water, melted at 181–182° C. (vacuum sealed capillary), showed $[\alpha]_D+63°$ (1.0% in ethanol), and showed maximum absorption in the ultraviolet at 283 millimicrons in alcohol solution with a specific extinction coefficient of 10.93. The carbon and hydrogen content was found by analysis to be in agreement with the calculated values for 6-hydroxydehydroabietinol.

While the foregoing examples have shown the process of base catalyzed rearrangement applied to the photoperoxide of levopimaric acid, the process can be applied with equivalent results to the peroxides obtained from the various derivatives of levopimaric acid. Various derivatives of levopimaric acid, such as esters and the corresponding alcohol, levopimarinol, can be oxidized in basic medium and subsequently dehydrated with equivalent results.

The base catalyzed rearrangement of 6,14-peroxy-Δ7(8)-dihydroabietic acid is best carried out in a polar or semipolar solvent wherein a suitable hydroxyl ion concentration can be attained, and wherein the peroxide has suitable solubility. Mixtures of alcohol and water fill this requirement in addition to being readily and economically obtainable. For this reason the solvent employed will commonly be water and a mixture of water and an alcohol such as methyl, ethyl, isopropyl, butyl and other low molecular weight alcohols and mixtures of such alcohols, generally up to about 95% of alcohol. The alkalizer can be any of several readily available materials which produce a high concentration of hydroxyl ion in polar and semipolar solvents and will normally be a metal hydroxide such as the hydroxides of sodium, potassium, lithium and calcium.

When the process of this invention is employed to convert levopimaric acid to a hydroxy-ketone, without isolation of the intermediate peroxide, the process will again normally be carried out in a polar or semipolar solvent, with the further specification that the light transtmittancy of the solvent must be such that the light required for the activation of the sensitizer is largely transmitted by the solvent. The choice of sensitizer, solvent, light source, and reaction vessel are interdependent, in that the apparent efficiency of the sensitizer depends upon the light transmission characteristics of the solvent and reaction vessel as well as the spectrum of the light source. The sensitizer can be any of a large number of organic dyes such as the resorcinolphthalein dyes, quinones such as ortho-naphthoquinone and analogous compounds in which either or both of the oxygen atoms are replaced by carbon, nitrogen and sulfur. As shown in the above mentioned Ser. No. 653,255, the dyes which can be used also include rose bengal, methylene blue, erythrosin, eosin, retene quinone, 1,2-naphthoquinone, chlorophyl, and fluorescein, and the light used should have wavelengths in the range of about from 2000 to 7000. The light produced by an incandescent lamp and the fluoroescent lamp set forth in the foregoing examples have wavelergths falling within the required range. A mixture of several dyes can be employed in order to increase the efficiency of utilization of light. The concentration of sensitizer employed is also dependent upon several other variables such as the dimensions of the reaction vessel and the nature of the light source. The concentration of sensitizer employed will normally be just sufficient to absorb most of the light of active wavelengths emitted by the light source. The concentration of alkalizer employed should ordinarily be quite low since the 6,14-peroxy-Δ7(8)-dihydroabietic acid is very sensitive to alkali. The peroxide is readily rearranged at 25° C. to a hydroxy-ketone by 0.01 molar sodium hydroxide in excess of the amount of alkali required to neutralize the carboxyl function of the peroxide. Higher concentrations of alkali may be used if desired. Rearrangement of the peroxide can be effected without temperature control or at 20° to 40° C., but the process can be accelerated by heating to 80° and 100° C. without appreciably decreasing the yield of the desired product. The base catalyzed rearrangement step of the process can be carried out at temperatures from about 0° C. to about 100° C. and more commonly from about 20° C. to about 80° C.

Dehydration of 6-keto-14-hydroxy-Δ7(8)-dihydroabietic acid yields 6-ketoabietic acid and 6-hydroxydehydroabietic acid. When 6-ketoabietic acid is the desired product, the dehydration should be conducted under mild conditions such as in acetic acid in the absence of mineral and other strong acid; whereas, when 6-hydroxydehydroabietic acid is the desired product, the dehydration can be effected thermally and by mineral acid catalysis. The dehydration product can then be subjected to further heating in the presence of a strong acid catalyst, to isomerize the 6-ketoabietic acid present to 6-hydroxydehydroabietic acid.

The products of the process of this invention are recovered by conventional processes such as extraction with a solvent, crystallization and distillation. The 6-hydroxydehydroabietic acid did not crystallize well from most solvents but it can be purified by crystallization from carbon tetrachloride as a molecular compound with carbon tetrachloride and from glacial acetic acid as an equimolecular compound with acetic acid. The 6-keto-14-hydroxy-Δ7(8)-dihydroabietic acid, 6-ketoabietic acid and 6-hydroxydehydroabietic acid are useful as intermediates in the synthesis of other compounds. The process of this invention affords a new and simpler and more efficient method of producing 6-hydroxydehydroabietinol, which has been shown to possess marked physiological activity.

The terms "molecular compounds" and "molecular complexes" are well-known in the art and have well-recognized meanings. P. Hermans, in "Introduction to Theoretical Organic Chemistry" (Elsevier Publishing Co.; New York; 1954), page 183, describes this class of compounds as follows: "Under this designation it is usual to include several groups of substances which are characterized by being produced by the mutual addition of two different kinds of molecules in a stoichiometric ratio to form a rather loose compound, from which the two molecular species can generally be readily recovered unchanged."

A detailed discussion of the subject is provided on pages 183 to 187 of the same textbook.

What we claim and desire to protect by Letters Patent is:

1. 6-keto-14-hydroxy-Δ7(8)-dihydroabietic acid.
2. 6-ketoabietic acid.
3. The equimolecular compound of 6-hydroxydehydroabietic acid and acetic acid.
4. The process for producing 6-ketoabietic acid and 6-hydroxydehydroabietic acid which comprises contacting levopimaric acid with molecular oxygen in an alkaline medium in the presence of a sensitizing dye selected from the group consisting of rose bengal, methylene blue, erythrosin, eosin, retene quinone, 1,2-naphthoquinone, chlorophyl, and fluorescein and light having wavelengths in the range of about from 2000 to 7000 A at a temperature of about from 0° to 100° C. to produce 6-keto-14-hydroxy-Δ7(8)-dihydroabietic acid and then dehydrating said 6-keto-14-hydroxy-Δ7(8)-dihydroabietic acid to produce 6-ketoabietic acid and 6-hydroxydehydroabietic acid.
5. The process for producing 6-keto-14-hydroxy-Δ7(8)-dihydroabietic acid which comprises contacting levopimaric acid with molecular oxygen in an alkaline medium in the presence of a sensitizing dye selected from the group consisting of rose bengal, methylene blue, erythrosin, eosin, retene quinone, 1,2-naphthoquinone, chlorophyl, and fluorescein and light having wavelengths in the range of about from 2000 to 7000 A at a temperature of about from 0° to 100° C.
6. The process for producing 6-keto-14-hydroxy-Δ7(8)-dihydroabietic acid which comprises subjecting 6,14-peroxy-Δ7(8)-dihydroabietic acid to an alkaline medium.
7. The process for producing 6-ketoabietic acid and 6-hydroxy-dehydroabietic acid which comprises dehydrating 6-keto-14-hydroxy-Δ7(8)-dihydroabietic acid.

8. The process for producing 6-hydroxydehydroabietic acid which comprises contacting a solution of 6-ketoabietic acid in a solvent selected from the group consisting of polar and semi-polar solvents with a strong acid catalyst.

9. The process of separating 6-hydroxydehydroabietic acid from crude reaction mixtures containing the same which comprises adding carbon tetrachloride to said crude reaction mixture and recovering a molecular compound of 6-hydroxydehydroabietic acid and carbon tetrachloride.

10. The process of separating 6-hydroxydehydroabietic acid from crude reaction mixtures containing the same which comprises adding glacial acetic acid to said crude reaction mixture and recovering an equimolecular compound of 6-hydroxydehydroabietic acid and acetic acid.

11. A process for producing 6-hydroxydehydroabietinol which comprises contacting a member of the group consisting of levopimaric acid and esters thereof with molecular oxygen in an alkaline medium in the presence of a sensitizing dye selected from the group consisting of rose bengal, methylene blue, erythrosin, eosin, retene quinone, 1,2-naphthoquinone, chlorophyll, and fluorescein and light having wavelengths in the range of about from 2000 to 7000 A. at a temperature of about from 0° to 100° C. to produce as a first reaction product a member of the group consisting of 6-keto-14-hydroxy-$\Delta 7(8)$-dihydroabietic acid and esters thereof, dehydrating said first reaction product to produce as a second reaction product a member of the group consisting of 6-ketoabietic acid and esters thereof, heating said second reaction product in a solvent selected from the group consisting of polar and semi-polar solvents in the presence of a a member of the class consisting of 6-hydroxydehydroabietic acid and esters thereof, separating said third reaction product from the reaction mixture, refluxing a solution of said third reaction product in an inert solvent with lithium aluminum hydride, and recovering 6-hydroxydehydroabietinol from the reaction mixture.

References Cited in the file of this patent

FOREIGN PATENTS 1,118,040     France _____ Mar. 5, 1956

OTHER REFERENCES

Wagner et al.: Synthetic Organic Chemistry, pp. 155–8 (1953).